United States Patent
Antony (10) Patent No.: US 10,389,852 B2
(45) Date of Patent: Aug. 20, 2019

(54) METHOD AND SYSTEM FOR PROVIDING A ROAMING REMOTE DESKTOP

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 135 days.

(21) Appl. No.: 14/754,165

(22) Filed: Jun. 29, 2015

(65) Prior Publication Data

US 2015/0304455 A1    Oct. 22, 2015

Related U.S. Application Data

(63) Continuation of application No. 13/787,641, filed on Mar. 6, 2013, now Pat. No. 9,069,608.

(51) Int. Cl.
| | |
|---|---|
| H04L 29/08 | (2006.01) |
| H04L 29/06 | (2006.01) |
| G06F 9/455 | (2018.01) |
| G06F 9/48 | (2006.01) |
| G06F 9/50 | (2006.01) |
| G06F 11/14 | (2006.01) |

(52) U.S. Cl.
CPC .......... *H04L 67/40* (2013.01); *G06F 9/45558* (2013.01); *G06F 9/4856* (2013.01); *G06F 9/5027* (2013.01); *G06F 9/5088* (2013.01); *H04L 29/08144* (2013.01); *H04L 67/1095* (2013.01); *H04L 67/1097* (2013.01); *G06F 11/1458* (2013.01); *G06F 2009/4557* (2013.01); *G06F 2009/45562* (2013.01)

(58) Field of Classification Search
CPC .. G06D 2009/4557; G06F 2009/45562; G06F 2009/45575; G06F 3/0647; H04L 45/126; H04L 67/1002
See application file for complete search history.

(56) References Cited

U.S. PATENT DOCUMENTS

| | | | |
|---|---|---|---|
| 6,437,803 B1 | 8/2002 | Panasyuk et al. | |
| 8,893,123 B2 | 11/2014 | Miyamoto et al. | |

(Continued)

OTHER PUBLICATIONS

European Office Action dated Sep. 15, 2016, filed in European counterpart Application No. 14710705.6, 4 pages.

(Continued)

*Primary Examiner* — Tom Y Chang
(74) *Attorney, Agent, or Firm* — Patterson + Sheridan, LLP (57) ABSTRACT

Techniques are disclosed for migrating a linked clone virtual machine (VM) based on a location of a client device. In one embodiment, a client device transmits its location to a VM management center, and a migration application running thereon determines whether the client device and a linked clone VM to which the client device is attempting to connect are at the same location. If the client device and the linked clone VM are not at the same location, the migration application identifies a VM hosting site proximate to the client device, and instructs a hypervisor to "cold" migrate the linked clone VM and its associated redo log to a VM host and a storage device, respectively, at the identified VM hosting site. The link clone VM may then be "actively" linked to a base VM at the VM hosting site, while maintaining "passive" links to base VM(s) at other locations.

23 Claims, 4 Drawing Sheets

(56) References Cited

U.S. PATENT DOCUMENTS

| | | | |
|---|---|---|---|
| 2003/0182427 A1* | 9/2003 | Halpern | G06F 9/4843 709/226 |
| 2007/0174410 A1 | 7/2007 | Croft et al. | |
| 2008/0256079 A1* | 10/2008 | Saha | H04L 41/0806 |
| 2010/0070725 A1* | 3/2010 | Prahlad | G06F 11/1453 711/162 |
| 2010/0257269 A1* | 10/2010 | Clark | G06F 9/4856 709/226 |
| 2011/0004680 A1 | 1/2011 | Ryman | |
| 2011/0047541 A1* | 2/2011 | Yamaguchi | G06F 9/45558 718/1 |
| 2011/0126197 A1* | 5/2011 | Larsen | H04L 9/3213 718/1 |
| 2011/0131330 A1* | 6/2011 | Beaty | G06F 9/4445 709/227 |
| 2011/0145199 A1* | 6/2011 | Prasad Palagummi | G06F 11/1469 707/654 |
| 2011/0185355 A1* | 7/2011 | Chawla | G06F 9/5077 718/1 |
| 2011/0239216 A1 | 9/2011 | Miyajima | |
| 2012/0096461 A1* | 4/2012 | Goswami | G06F 9/45558 718/1 |
| 2012/0278553 A1* | 11/2012 | Mudhiganti | G06F 17/30067 711/114 |
| 2012/0297041 A1* | 11/2012 | Momchilov | G06F 9/4443 709/223 |
| 2012/0331462 A1* | 12/2012 | Falko | G06F 9/45533 718/1 |
| 2013/0036418 A1* | 2/2013 | Yadappanavar | G06F 3/0611 718/1 |
| 2013/0054927 A1* | 2/2013 | Raj | G06F 3/0608 711/170 |
| 2013/0212161 A1* | 8/2013 | Ben-Shaul | G06F 9/4451 709/203 |
| 2013/0227558 A1* | 8/2013 | Du | G06F 9/45558 718/1 |
| 2013/0263119 A1* | 10/2013 | Pissay | G06F 9/45558 718/1 |
| 2013/0332610 A1* | 12/2013 | Beveridge | G06F 9/4445 709/226 |
| 2013/0332920 A1* | 12/2013 | Laor | G06F 9/45558 718/1 |
| 2014/0059207 A1* | 2/2014 | Gulati | G06F 9/505 709/224 |
| 2014/0096134 A1* | 4/2014 | Barak | G06F 9/45558 718/1 |
| 2014/0101649 A1* | 4/2014 | Kamble | G06F 9/45558 717/170 |
| 2014/0122731 A1 | 5/2014 | Burch et al. | |
| 2014/0149352 A1* | 5/2014 | Chan | G06F 9/455 707/639 |
| 2014/0149983 A1* | 5/2014 | Bonilla | G06F 9/45558 718/1 |
| 2014/0229936 A1* | 8/2014 | Gaonkar | G06F 9/45558 718/1 |
| 2014/0250439 A1* | 9/2014 | Parashar | G06F 9/505 718/104 |
| 2015/0142921 A1* | 5/2015 | Yamada | H04L 67/1002 709/219 |

OTHER PUBLICATIONS

PCT International Search Report and Written Opinion for Application No. PCT/US2014/018541, dated Jul. 3, 2014.

\* cited by examiner

METHOD AND SYSTEM FOR PROVIDING A ROAMING REMOTE DESKTOP

CROSS-REFERENCE TO RELATED APPLICATION(S)

This application is a continuation of, and claims the benefit of, U.S. patent application Ser. No. 13/787,641 filed Mar. 6, 2013 entitled "Method and System for Providing a Roaming Remote Desktop," which is incorporated by reference herein in its entirety.

BACKGROUND

Server-based computing allows a networked client device, remotely situated with respect to a server, to access computing resources on the server and control a particular "host" machine remotely from the client device. This type of interaction is commonly referred to as a "remote" session. For example, the client device may run desktop client software that uses a remote desktop protocol, such as Remote Desktop Protocol (RDP), Virtual Network Computing (VNC), or Personal Computer over Internet Protocol (PCoIP), to access a user's desktop running on a remote server. In remote sessions, the client device transmits user inputs, such as keyboard or mouse inputs, to the remote server. Then, the desktop client software receives an image of a graphical user interface (GUI) (in the form of image data) from the remote server. The GUI and the image data received by the desktop client software are generated by the operating system and applications running in the remote server. In some instances, the GUI and image data are generated by a virtual machine (VM) executing on the remote server and processing user inputs received from the client device.

Mobile devices have evolved to provide sophisticated computing platforms, complete with large display areas and touch sensitive surfaces, among other components. The computing power of these devices has steadily increased, allowing remote sessions to be initiated from the palm of one's hand. Further, such mobile devices allow users to establish remote desktop connections to VMs from different locations. For example, a user may initiate a remote desktop connection to a VM in one city and re-connect to the same VM from a different city. In such cases, the VM typically continues to run on the server on which the VM was initially provisioned. As used herein, provisioning is the process of creating and deploying a VM, including assigning and configuring resources, such as processors, memory, network, and disk storage, associated with the VM. The server on which the VM was initially provisioned may be far from the user's new location, thereby affecting the remote session experience, as network connectivity tends to be slower over longer distances.

SUMMARY

One embodiment provides a computer-implemented method for providing a roaming remote desktop. The method generally includes maintaining, at a first VM hosting site, a delta disk for a linked clone virtual machine (VM), wherein the delta disk includes metadata indicating a base VM to which the linked clone VM is actively linked and one or more other base VMs at other VM hosting sites to which the linked clone VM is passively linked. The method further includes, responsive to receiving an updated location of a client device: migrating the linked clone VM to one of the other VM hosting sites, and changing the delta disk metadata to indicate the linked clone VM is actively linked to the base VM at the one of the other VM hosting sites and passively linked to the base VM at the first VM hosting site.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Embodiments presented herein provide techniques for migrating a VM based on a location of a client device to provide better connectivity between the client device and the VM. In one embodiment, a linked clone VM is provisioned for a remote session initiated from the client device. As used herein, a "linked clone" is a duplicate of a parent VM that uses the same base disk as the parent VM, with a chain of "redo logs" (also known as "delta disks") to track the differences between the parent VM and the linked clone. At a later time, the client device transmits its location (e.g., latitude and longitude coordinates, city name, country name, office name, IP address of a Wi-Fi router or internet service provider (ISP) to which the client device is connected, a private IP address of the client device, etc.) to a VM management center, where a migration application determines whether the client device and the linked clone VM are at the same location. Here, "same location" may be defined in any feasible manner, such as within a given radius, in the same city, in the same country, in the same office, having less than a given latency, etc. If the client device and the linked clone VM are not at the same location, the migration application identifies a VM hosting site proximate to the location of the client device and instructs a hypervisor, or another component (e.g., the VM management center), to migrate the linked clone VM and its associated redo log to a VM host and a storage device, respectively, at the identified VM hosting site. Note, identical base VMs may be maintained at multiple VM hosting sites as part of the setup of the virtual infrastructure to enable the linked clone to be migrated independent of its base VM. The migration of the linked clone VM may be performed "cold," i.e., with the VM in a "powered off" state. After migration, the linked clone VM may be "actively" linked to the base VM at the identified hosting site, while maintaining "passive" links to the base VMs at other VM hosting sites.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
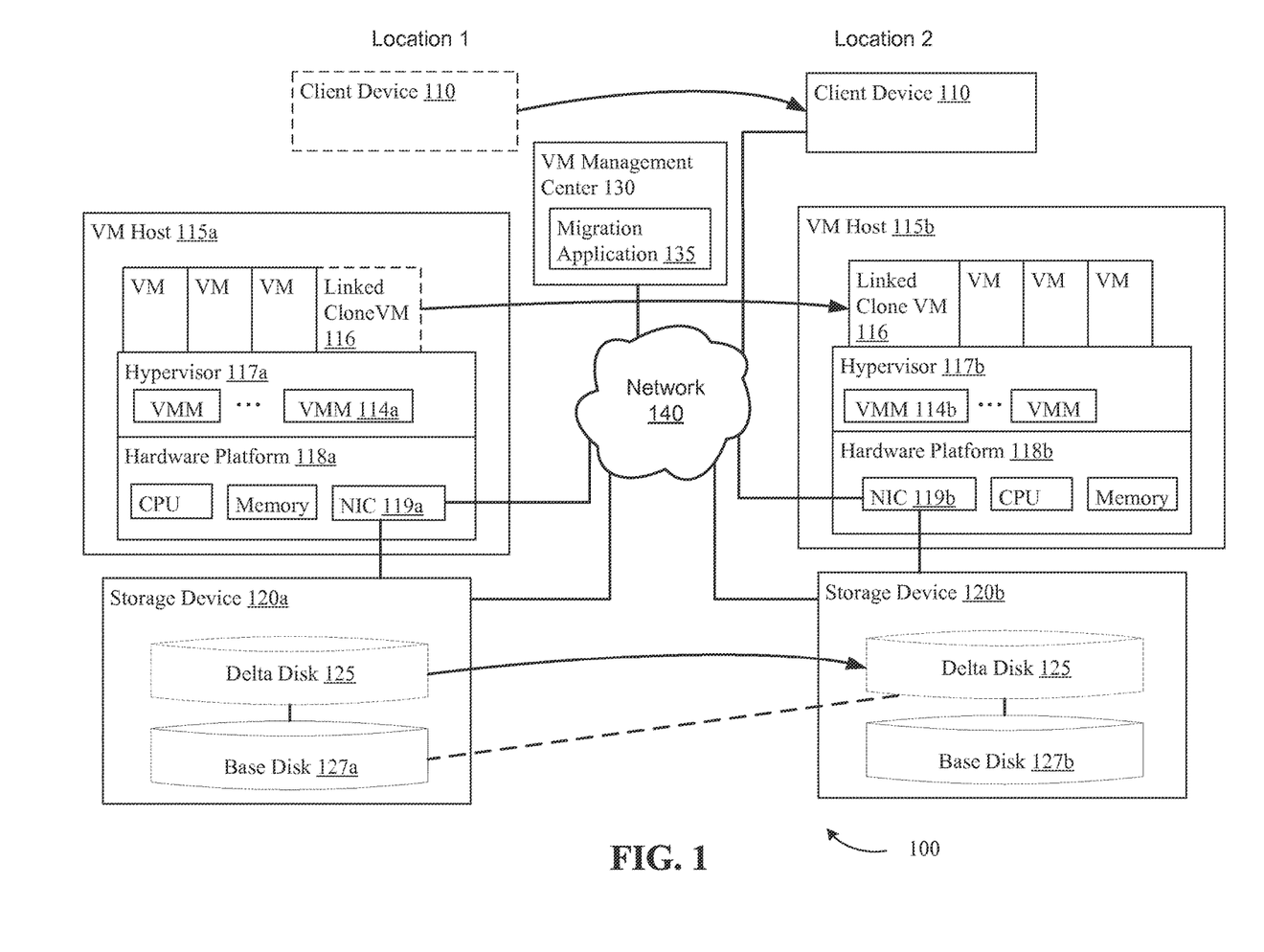
FIG. 1 illustrates an approach for migrating a linked clone VM for better network performance and user experience, according to an embodiment of the invention.

FIG. 1 illustrates an approach for migrating a linked clone VM for better network performance and user experience, according to an embodiment. As shown, a virtual infrastructure includes a VM management center 130, as well as VM host computers 115a, 115b and storage devices 120a, 120b at two different locations. Although only one VM host and storage device is depicted at each location, in practice, a virtual infrastructure may include VM hosting sites, each of which include clusters of any number of VM hosts networked to shared storage, at any number of locations that are any distance apart (e.g., in different cities, different countries, etc.).

Illustratively, VM host 115a and its hardware resources 118a (e.g., CPU, RAM, and network interface card (NIC) 119a) support VMs (e.g., linked clone VM 116) through software interface layer (also referred to herein as a "hypervisor") 117a. Similarly, VM host 115b and its hardware resources (e.g., CPU, memory, and network interface controller (NIC) 119b) support VMs through hypervisor 117b. Hypervisors 117a, 117b may run on top of the operating system of VM hosts 115a, 115b or directly on hardware components of the VM hosts. Each of the VMs may implement a virtual hardware platform which includes, e.g., virtual CPU(s), virtual memory, virtual disks, and virtual devices. Device emulators of a virtual machine monitor (VMM), such as VMM 114a and VMM 114b, provide hardware emulation for corresponding VMs. In addition, the virtual hardware platforms of the VMs themselves support execution of guest operating systems and client application programs running on the guest operating systems. Example guest operating systems include Microsoft Windows® and Linux®.

Illustratively, each VM host 115a, 115b has a connection to an Ethernet network 140 (e.g., the Internet) through its respective NIC 119a, 119b. Each VM host 115a, 115b is further connected to a storage device 120a, 120b, each of which may be, e.g., a network attached storage (NAS) device or a storage array network (SAN) device. A NAS device includes a network file system (NFS) and one or more disks. As used herein, "disk" refers to any data storage device that can store data which can thereafter be input to a computer system, including a memory or input/output cache on a computer, a disk cache including data to be written to a more persistent storage medium, a hard drive, a magnetic tape, or a solid state device. A NAS device is exposed to a host computer as a file system. Accordingly, the host computer accesses the NAS device via file-based commands. NFS provides the mapping from various filenames to corresponding locations on disks. In contrast, a SAN device includes one or more logical units (LUNs) that are logically provisioned from disks. SAN devices provide block level storage to a host computer via a defined protocol such as SCSI. Here, LUNs provide a linear, block addressable storage array to associated host computers. Note, although storage devices 120a, 120b are connected to VM host 115, 115b, respectively, via NIC 119a and NIC 119b in FIG. 1, VM hosts may be connected to SAN devices via a disk interface instead, such as a "host bus adapter" (HBA).

VM management center 130 is a computer program that resides and executes in a central server, which may exist as a separate computing system dedicated for this purpose. Alternatively, VM management center 130 may execute on one of VM hosts 115a, 115b. VM management center 130 is in communication with each of VM hosts 115a, 115b, and carries out administrative tasks including, but not limited to, managing VM hosts 115a, 115b, managing VMs running within each VM host 115a, 115b, provisioning the VMs, migrating VMs from one VM host to another, allocating physical resources (e.g., processor and memory), load balancing between VM hosts, and so on.

When provisioning a new VM, it may be advantageous to start by copying an existing VM with desirable characteristics. This process is referred to herein as "cloning." One form of cloning creates a copy of a virtual machine that shares virtual disks with the parent VM (e.g., a base VM from which linked clones were initially created) in an ongoing manner, referred to herein as linked cloning. This is in contrast to full cloning, in which a complete and independent copy of the virtual machine is created. As discussed, a linked clone is a duplicate of a parent VM that uses the same base disk as the parent VM, with a chain of "redo logs" (also known as "delta disks") to track the differences between the parent VM and the linked clone. These redo logs include only the differences (deltas) as compared to the base disk. Thus, the base disk remains intact and available for future cloning, while various clones of the template may write to their respective redo logs without affecting the base disk or the redo logs of other clones. As further described below, additional redo logs may be created in order to capture the state of a VM's virtual disk at a specific point in time. The new redo log points to the immediately prior redo log, which in turn points to the prior redo log, and so on, until the base disk is reached. Linked cloning conserves disk space, as compared to full cloning, and allows multiple virtual machines to use the same software installation.

As shown in FIG. 1, linked clone VM 116 and its associated redo log 125 are migrated from VM host 115a to VM host 115b and from storage device 120a to storage device 120b, respectively, after client device 110 is relocated from location 1 to location 2. Here, client device 110 may be any mobile computing device, such as a laptop computer, a personal digital assistant (PDA), a tablet computer, a mobile phone, and the like. In one embodiment, client device 110 may transmit its location to VM management center 130 while establishing a remote session. If the location of client device 110 is different from that of the VM to which client device 110 is connecting for the remote session, then a migration application 135 running on VM management center 130 may identify a VM hosting site (and a specific VM host and storage device at that hosting site) which is at or near the location of client device 110 to migrate the VM to. For example, migration application 135 may determine that VM host 115b and storage device 120b are at the same location (e.g., in the same city) as client device 110 and thus a target of migration. After having identified such a migration target, VM management center 130 may issue a command to VM host 115a directing it to transfer (e.g., via a copy and delete operation) linked clone VM 116 and associated files, including redo log 125, from VM host 115a to VM host 115b and from storage device 120a to storage device 120b, as illustrated. Hypervisor 117a or another software component within VM host 115a may include programming to carry out the migration.

As shown, an identical base disk 127a, 127b is maintained at VM hosting sites at both locations 1 and 2, respectively. Doing so permits redo log 125, which is typically smaller in size (e.g., 10 MB) than base disk 127a (e.g., 50 GB), to be migrated without also migrating base disk 127a, thus reducing migration time. As discussed in greater detail below, metadata in redo log 125 indicates an active link to a base VM at the migration target and a passive link to base VMs at other locations after the migration. As used herein, a link between a linked clone VM and a base VM is "active" if virtual disk data which is unavailable in a redo log of the linked clone VM is accessed from the base disk of the base VM. In contrast, "passive" links may be maintained to base VMs whose base disks are not accessed when data is unavailable in the redo log of the linked clone VM. In one embodiment, each linked clone has only one active link to a base VM at the location proximate to the client device, but may have multiple passive links to base VMs at other locations.

In one embodiment, migration of linked clone 116 may be performed "cold," with the linked clone VM 116 being transferred in a "powered off" state such that the VM is not currently executing or in a scheduling queue. Doing so avoids transferring memory content associated with VM 116, which may be large in size (e.g., 4 GB). Because neither base disk 127a nor the memory content of linked clone VM 116 is transferred during its migration, the migration may be accomplished relatively quickly, which may be important where, e.g., the VM 116 needs to be migrated over a WAN such as the internet. For example, the migration may be performed as part of the connection process between client device 110 and linked clone VM 116.

Figure 2:
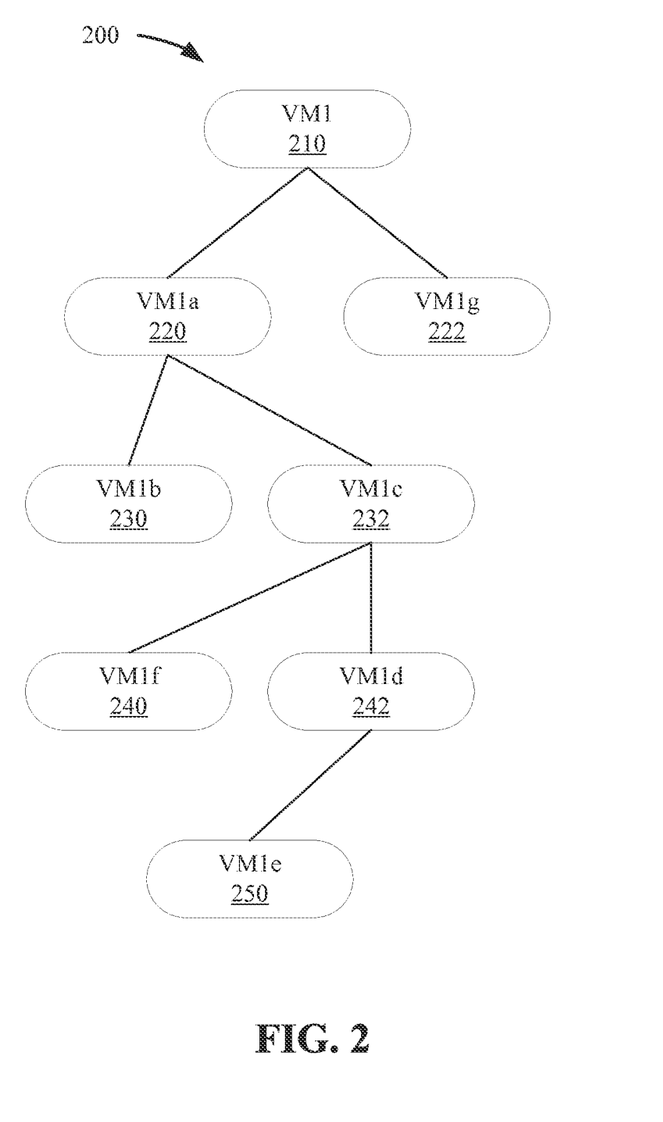
FIG. 2 is a conceptual diagram of how linked clones may be related in a hierarchy.

FIG. 2 is a conceptual diagram of how linked clones may be related in a hierarchy. As shown, hierarchy 200 includes a base disk VM1 210 and a number of redo logs 220, 222, 230, 232, 240, 242, 250. Hierarchy 200 is depicted as a tree, and may be managed by VMMs for their respective VMs. At the top of the tree, VM1 210 represents a base disk associated with a VM such as a template VM. The VM associated with base disk VM1 210 is then cloned, forming two redo logs VM1a 220 and VM1g 222. The VM associated with redo log VM1a 220 is then cloned, forming two redo logs VM1b 230 and VM1c 232. The process continues until hierarchy 200 is formed. Each horizontal row represents a level of hierarchy 200 where the first level comprises base disk VM1 210, the second level comprises redo logs VM1a220 and VM1g 222, and so on. A parent/child relationship exists when a base disk or redo log at one level in hierarchy 200 is associated with a base disk or redo log at an adjacent level in hierarchy 200. For example, base disk VM1 210 is the parent of two child redo logs represented by redo logs VM1a 220 and VM1g 222. In contrast, hierarchy 200, redo logs VM1g 222, VM1b230, VM1f 240, and VM1e 250 have no children.

An advantage of creating redo logs is that only the differences between the redo log and the respective parent disk at a particular point in time are stored rather than a full image of the virtual disk. In a full cloning example, redo logs shown in FIG. 2 would include full disk images rather than only difference information. In such a case, the amount of storage required would be higher as compared with storing redo logs, resulting in more efficient storage and faster transfers between storage devices. For example, base disks and associated redo logs may be stored as files within a SAN or NAS device. By using linked cloning, the amount of virtual disk storage space required on the SAN or NAS device is reduced as compared with full cloning. Linked cloning may also result in faster VM provisioning and transfers. After a linked clone is created, further disk writes from the source VM and the target VM are stored in their individual redo logs, and only the redo logs need to be transferred when migrating the linked clone VM, so long as the base disk is available on the destination storage device.

Figure 3:
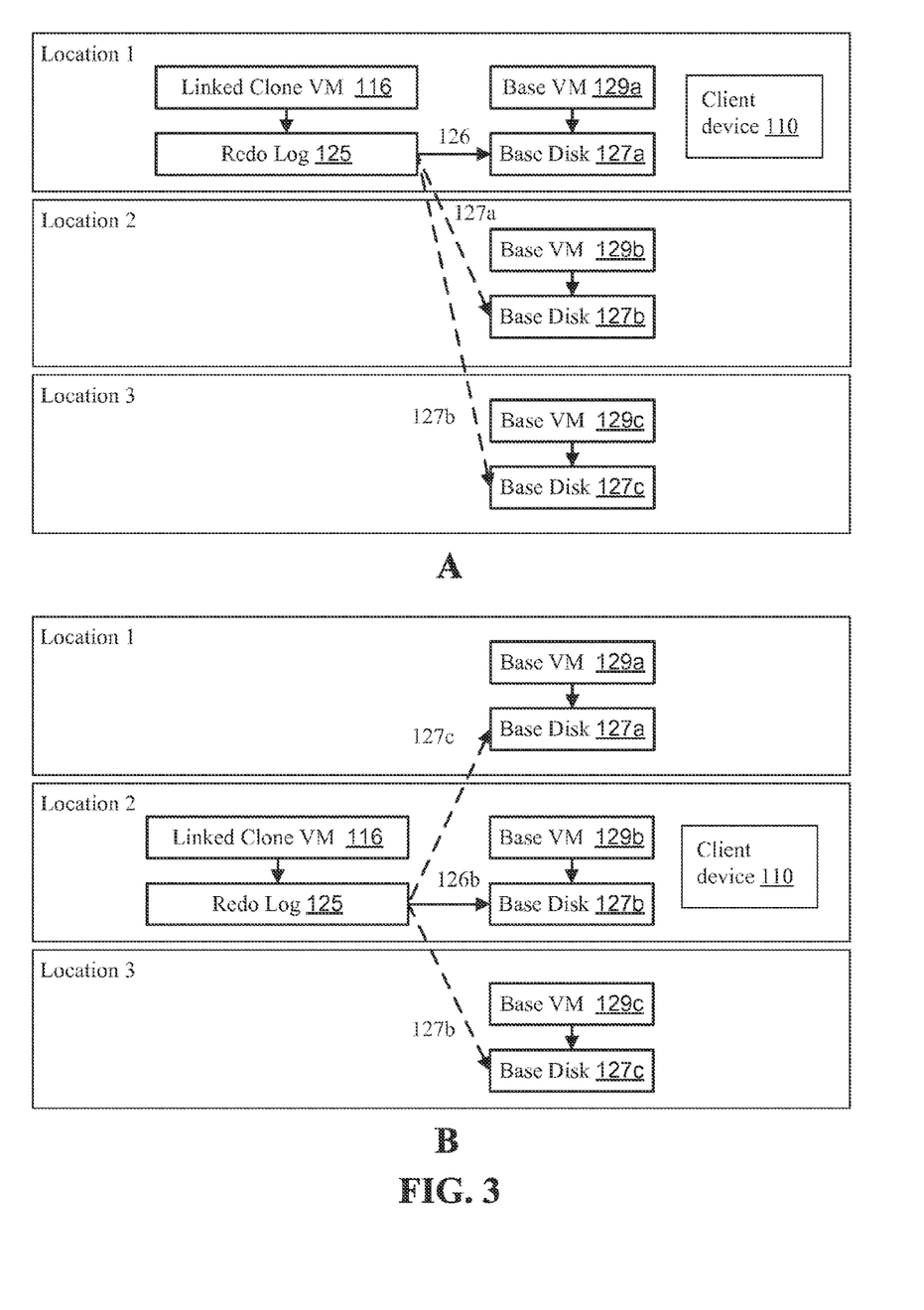
FIG. 3 illustrates active and passive links between a linked clone VM and base VMs at multiple locations, according to an embodiment of the invention.

FIG. 3 illustrates active and passive links between linked clone VM 116 and base VMs 129a, 129b, 129c at multiple locations, according to an embodiment. As shown in panel A, base disks 128a, 128b, 128c are identical copies, and parents to redo log 125 of linked clone VM 116. That is, redo log 125 points to each of base disks 128a, 128b, 128c, and only the differences between redo log 125 and each of base disks 128a, 128b, 128c are stored in redo log 125. In one embodiment, the links 126, 127a, 127b may be maintained as metadata in a file which represents the redo log 125, e.g., a .vmdk format disk image file.

Illustratively, link 126 between linked clone VM 116 and base VM 129a is "active," whereas links 127a, 127b between linked clone VM 116 and base VMs 129b, 129c are "passive." As discussed, a link between a linked clone VM and a base VM is "active" if virtual disk data which is unavailable in a redo log of the linked clone VM is accessed from the base disk of the base VM. In contrast, "passive" links may be maintained to base VMs whose base disks are not accessed when data is unavailable in the redo log of the linked clone VM. The active and passive links may indicate which base disks at multiple locations may be used with the redo log. Further, updates to one base disk on which the redo log is able to rely may be propagated to all other copies of the base disk in order to avoid data corruption in a virtual disk comprising the redo log and the base disk. Here, the base disks upon which the redo log relies may identified as the base VMs to which the linked clone VM is actively or passively linked.

Panel B shows the result of a migration operation performed after client device 110 is relocated to location 2. In response to such a relocation, linked clone 116 and its associated redo log 125 have been migrated to a VM host and a storage device at a VM hosting site at location 2. Doing so provides faster connectivity between client device 110 and linked clone VM 116, as network packets may traverse less distance, fewer routers and switches, etc., between client device 110 and the VM hosting site at location 2. After being copied to the VM hosting site at location 2, linked clone VM 116 is further modified to point to base VM 129b at location 2 with active link 126, and to point to base VMs 129a and 129c at VM hosting sites at locations 1 and 3 with passive links 127c and 127b, respectively. Where the links 126b, 127b, 127c are maintained as metadata in a file which represents the redo log 125, such metadata may be updated to indicate active link 126b and passive links 127b, 127c. Data which is unavailable on redo log 125 may then be accessed from base disk 128b based on the active link 126. Doing so reduces virtual disk access times, as compared to accessing data from base disks 128a, 120c at VM hosting sites at locations 1 and 3, which are further than the VM hosting site at location 2.

Figure 4:
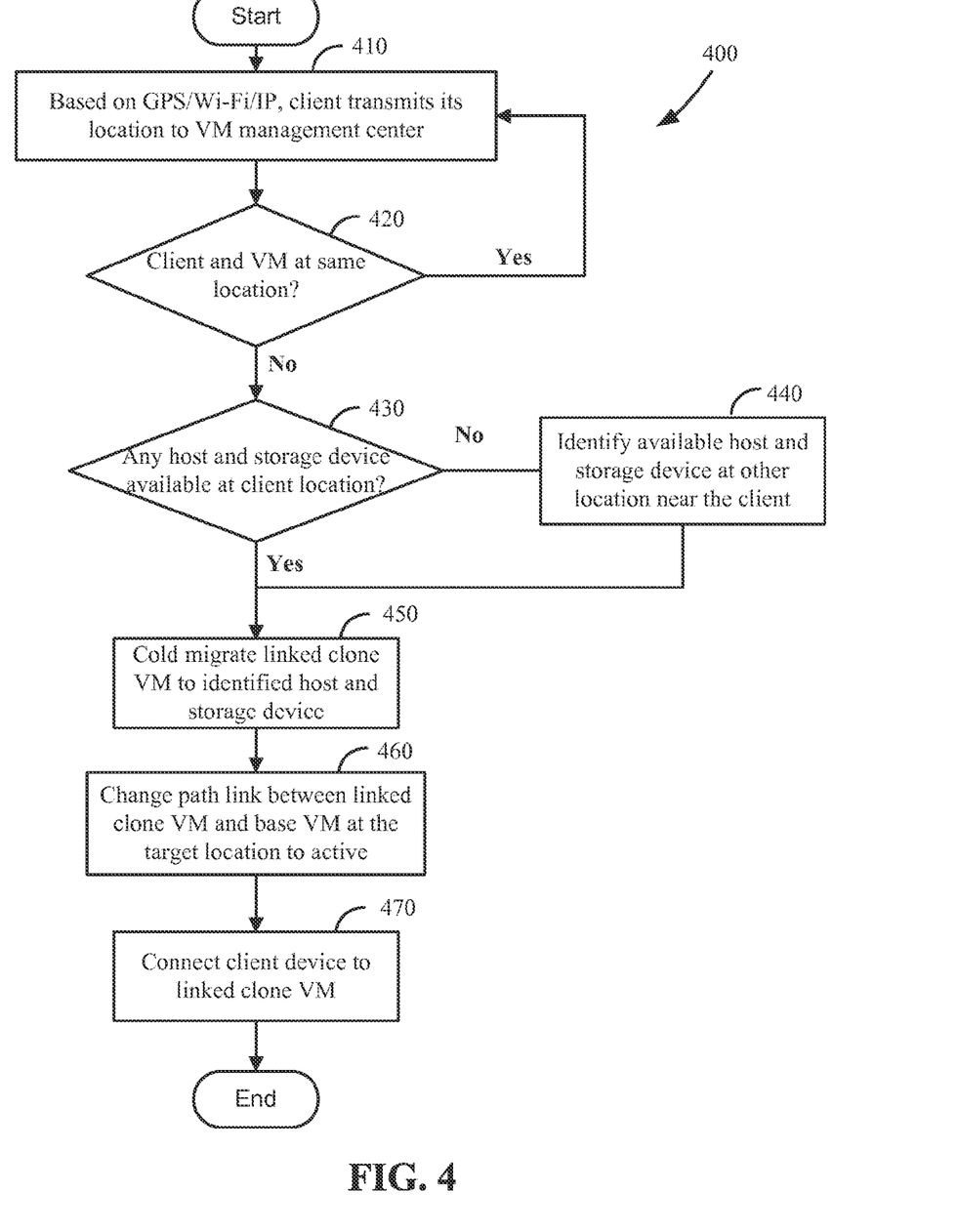
FIG. 4 illustrates a method for migrating a linked clone VM based on a client device's location, according to an embodiment of the invention.

FIG. 4 illustrates a method 400 for migrating a linked clone VM based on a client device's location, according to an embodiment. Such a migration may be performed as part of the connection process to the VM, or more actively, such as in response to detecting that the client device has changed location. As shown, the method 400 begins at step 410, where client device 110 transmits its location to VM management center 130. The client device 110 may determine its location based on global positioning system (GPS) information, an Internet Protocol (IP) address of a Wi-Fi router or internet service provider (ISP) to which client device 110 is connected, a private IP address of client device 110, and the like. For example, GPS receivers are now integrated into many mobile phones, and may be used to provide latitude and longitude coordinates which may then be transmitted to VM management center 130. As another example, client device 110 may convert the IP address of the Wi-Fi router or ISP to which it is connected to a country, city, region, area code, latitude and longitude, etc., and send this location information to VM management center 130. Databases for such conversion, based on IP address ranges, are well-known and publicly available. As yet another example, the client device may determine its location by the IP address range of its private IP address if a company uses different IP address ranges at different locations (e.g., 192.168.1.x at one location and 192.168.2.x at another location) when the client device connects to the network in the company's offices. Alternatively, client device 110 may send the IP address of the Wi-Fi router or ISP, or its private IP address, and VM management center 130 may itself convert the address to a country, city, region, area code, latitude and longitude, etc.

At step 420, migration application 135 running on VM management center 130 determines whether client device 110 and the linked clone VM 116 to which the client device is to be connected are at the same location. In one embodiment, migration application 135 may maintain a database of VM hosting sites in terms of latitude and longitude coordinates, IP address, or the like. Migration application 135 may then compare the location received from client device 110 with the locations of the VM hosting site where the VM is provisioned. As discussed, the "same location" may be defined in any feasible manner, such as within a given radius, in the same city, in the same country, in the same office, having less than a given latency, etc. For example, migration application 135 may calculate a distance between the latitude and longitude coordinates of client device 110 and those of the VM hosting site and determine whether the client device 110 and the VM hosting site are less than a given distance apart. As another example, migration application 135 may determine whether the client device 110 and the VM hosting site are located in the same city based on a comparison of the IP address of the VM host and that of the Wi-Fi router or ISP provided by client device 110.

If migration application 135 determines that client device 110 and linked clone VM 116 are at the same location, then the method 400 returns to step 410, where client device 110 may transmit its location again at a later time, such as when the client device 110 attempts to connect to linked clone VM 116 again. If, however, migration application 135 determines that client device 110 and linked clone VM 116 are not at the same location, then method 400 continues at step 430, where migration application 135 determines whether any host and storage device are available at the client device's 110 location. As discussed, migration application 135 may maintain a database of VM hosting sites, and, in such a case, migration application 135 may query the database to identify a VM hosting site at the client device's 110 location, then identify a particular VM host and a storage device which are available at the VM hosting site. In one embodiment, migration application 135 may ensure that the identified host and storage device have sufficient resources to support the VM being migrated.

If no VM hosts and storage devices are available at a VM hosting site at the client's location, then method 400 continues at step 440, where VM management center 130 identifies a host and storage device at another location that is near the client device. Similar to determining whether client device 110 and linked clone VM 116 are at the same location, VM management center 130 may compare the location received from client device 110 with locations of available VM hosting sites based on latitude and longitude coordinates, city, country, region, etc. and identify available hosts and storage devices at a VM hosting site near the client device's 110 location. Note, any feasible definition of "near" may be used, such as the closest distance among available VM hosts and storage devices, within a given distance, having less than a given latency, and the like.

After a host and storage device are identified at or near the client's location, at step 450, migration application 135 issues an instruction to cold migrate linked clone VM 116 to the identified host and storage device. As discussed, a cold migration is a migration in which the VM is transferred in a powered off state such that memory content associated with the VM, which may be large in size (e.g., 4 GB), is not transferred. Further, because the VM being migrated is a linked clone, only its redo log 125, which is typically small in size (e.g., 50 MB), needs to be copied to the identified storage device if the base disk 127a upon which redo log 125 relies is already stored on that storage device. In one embodiment, a copy of base disk 127 may be stored on each of a number of storage devices at different locations such that migrating linked clone VM 116 to one of those locations only requires copying redo log 125.

At step 460, migration application 130 changes a link between linked clone VM 116 and base VM 129b at the target location, to which the VM 116 was migrated, to "active." As discussed, links between VM 116 and base VMs 129a, 129b may be maintained as metadata in a file (e.g., a vmdk file) which represents the redo log 125 of the linked clone VM 116. In one embodiment, migration application 130 may issue an instruction to a hypervisor, or another component (e.g., VM management center 130), to modify metadata of the file representing redo log 125 such that the link between VM 116 and the base VM 129b at the target location is marked as "active," while all other links are marked as "passive."

At step 470, client device 110 is connected to linked clone VM 116. That is, a remote session is established, with GUI and image data being generated by an operating system and applications running in the linked clone VM 116, and transmitted thereafter to client device 110. In turn, client device 110 may transmit user inputs to VM 116 to be processed there. Note, although discussed above primarily with respect to migrating linked clone VM 116 while connecting client device 110 to VM 116, in alternative embodiments, migrations may be performed at other times. For example, client device 110 may transmit its location to VM management center 130 when client device 110 connects to a different Wi-Fi router or ISP, and migration application 135 may issue commands to migrate VM 116 and its associated redo log 125 if VM 116 and redo log 125 are at a different location than client device 110.

Advantageously, embodiments described herein migrate linked clone VMs based on the location of a client device accessing the VM via a remote desktop application. Specifically, the linked clone VM may be migrated to a VM hosting site at the same location, or at a location near, the client device. Doing so provides faster connectivity between the client device and the linked clone VM. Further, cold migrating a linked clone VM only requires transferring its redo log, which is typically small in size and can thus be transferred quickly, which may be important where, e.g., the VM needs to be migrated over a WAN such as the internet.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for providing a roaming remote desktop, comprising:
   maintaining, at a first virtual machine (VM) hosting site, a chain of delta disks for a linked clone VM, wherein metadata of the chain of delta disks indicates a base VM at the first VM hosting site to which the linked clone VM is actively linked and a second base VM at a second VM hosting site to which the linked clone VM is passively linked, wherein a first delta disk of the chain of delta disks points to the base VM to which the linked clone VM is actively linked, and wherein each subsequent delta disk in the chain of delta disks points to a previous delta disk in the chain of delta disks; and
   responsive to receiving an updated location of a client device:
      migrating the linked clone VM and the chain of delta disks including the metadata from the first VM hosting site to the second VM hosting site, wherein the metadata includes an active and passive links information maintained in a file representing a redo log of the linked clone VM, and
      at the second VM hosting site, after the migrating, changing the metadata of the migrated chain of delta disks to indicate that the linked clone VM is actively linked to the second base VM at the second VM hosting site and passively linked to the base VM at the first VM hosting site, wherein updates to a first base disk is automatically propagated to a second base disk based on the active and passive links.

2. The method of claim 1, wherein the second VM hosting site is chosen from a plurality of VM hosting sites as a migration destination for the linked clone VM based on proximity to the updated location of the client device.

3. The method of claim 2, wherein proximity to the updated location of the client device includes at least one of being within a given radius, being in a same city, being in a same country, being in a same office, being physically closest to the client device, and having less than a given latency.

4. The method of claim 2, wherein proximity to the updated location of the client device is determined based on location information received from the client device including at least one of latitude and longitude, an internet protocol (IP) address of a Wi-Fi router, an IP address of an internet service provider, and a private IP address.

5. The method of claim 1,
   wherein the updated location of the client device is received during an attempt by the client device to connect to the linked clone VM, and
   wherein the migration is performed before the client device is connected to the linked clone VM.

6. The method of claim 1, wherein the updated location of the client device is received after the client device connects to a different Wi-Fi router or internet service provider (ISP).

7. The method of claim 1,
wherein the base VM at the first VM hosting site and the second base VM at the second VM hosting site have identical base disks.

8. The method of claim 1, wherein the migration of the linked clone VM is a cold migration in which the linked clone VM is migrated in a powered off state.

9. A non-transitory computer-readable storage medium embodying computer program instructions to performing a method for providing a roaming remote desktop, the method comprising:
maintaining, at a first virtual machine (VM) hosting site, a chain of delta disks for a linked clone VM, wherein metadata of the chain of delta disks indicates a base VM at the first VM hosting site to which the linked clone VM is actively linked and a second base VM at a second VM hosting site to which the linked clone VM is passively linked, wherein a first delta disk of the chain of delta disks points to the base VM to which the linked clone VM is actively linked, and wherein each subsequent delta disk in the chain of delta disks points to a previous delta disk in the chain of delta disks; and
responsive to receiving an updated location of a client device, migrating the linked clone VM and the chain of delta disks including the metadata from the first VM hosting site to the second VM hosting site, wherein the metadata includes an active and passive links information maintained in a file representing a redo log of the linked clone VM, such that, at the second VM hosting site, after the migrating, the metadata of the migrated chain of delta disks is changed to indicate that the linked clone VM is actively linked to the second base VM at the second VM hosting site and passively linked to the base VM at the first VM hosting site, wherein updates to a first base disk is automatically propagated to a second base disk based on the active and passive links.

10. The non-transitory computer-readable storage medium of claim 9, wherein the second VM hosting site is chosen from a plurality of VM hosting sites as a migration destination for the linked clone VM based on proximity to the updated location of the client device.

11. The non-transitory computer-readable storage medium of claim 10, wherein proximity to the updated location of the client device includes at least one of being within a given radius, being in a same city, being in a same country, being in a same office, being physically closest to the client device, and having less than a given latency.

12. The non-transitory computer-readable storage medium of claim 10, wherein proximity to the updated location of the client device is determined based on location information received from the client device including at least one of latitude and longitude, an internet protocol (IP) address of a Wi-Fi router, an IP address of an internet service provider, and a private IP address.

13. The non-transitory computer-readable storage medium of claim 9,
wherein the updated location of the client device is received during an attempt by the client device to connect to the linked clone VM, and
wherein the migration is performed before the client device is connected to the linked clone VM.

14. The non-transitory computer-readable storage medium of claim 9, wherein the updated location of the client device is received after the client device connects to a different Wi-Fi router or internet service provider (ISP).

15. The non-transitory computer-readable storage medium of claim 9,
wherein the base VM at the first VM hosting site and the second base VM at the second VM hosting site have identical base disks.

16. The non-transitory computer-readable storage medium of claim 9, wherein the migration of the linked clone VM is a cold migration in which the linked clone VM is migrated in a powered off state.

17. A system, comprising:
a processor; and
a memory, wherein the memory includes a program for reducing perceived read latency, the program being configured to perform operations for providing a roaming desktop, comprising:
maintaining, at a first virtual machine (VM) hosting site, a chain of delta disks for a linked clone VM, wherein metadata of the chain of delta disks indicates a base VM at the first VM hosting site to which the linked clone VM is actively linked and a second base VM at a second VM hosting site to which the linked clone VM is passively linked, wherein a first delta disk of the chain of delta disks points to the base VM to which the linked clone VM is actively linked, and wherein each subsequent delta disk in the chain of delta disks points to a previous delta disk in the chain of delta disks; and
responsive to receiving an updated location of a client device, migrating the linked clone VM and the chain of delta disks including the metadata from the first VM hosting site to the second VM hosting site, wherein the metadata includes an active and passive links information maintained in a file representing a redo log of the linked clone VM; such that, at the second VM hosting site, after the migrating, the metadata of the migrated chain of delta disks is changed to indicate that the linked clone VM is actively linked to the second base VM at the second VM hosting site and passively linked to the base VM at the first VM hosting site, wherein updates to a first base disk is automatically propagated to a second base disk based on the active and passive links.

18. The system of claim 17, wherein the second VM hosting site is chosen from a plurality of VM hosting sites as a migration destination for the linked clone VM based on proximity to the updated location of the client device.

19. The system of claim 17,
wherein the updated location of the client device is received during an attempt by the client device to connect to the linked clone VM, and
wherein the migration is performed before the client device is connected to the linked clone VM.

20. The system of claim 17, wherein the updated location of the client device is received after the client device connects to a different Wi-Fi router or internet service provider (ISP).

21. The method of claim 1, wherein the metadata, before and after the migrating, further indicates a third base VM at a third VM hosting site to which the linked clone VM is passively linked.

22. The non-transitory computer-readable storage medium of claim 9, wherein the metadata, before and after the migrating, further indicates a third base VM at a third VM hosting site to which the linked clone VM is passively linked.

23. The system of claim 17, wherein the metadata, before and after the migrating, further indicates a third base VM at a third VM hosting site to which the linked clone VM is passively linked.

* * * * *